United States Patent
Cheung et al.

(10) Patent No.: US 6,290,772 B1
(45) Date of Patent: *Sep. 18, 2001

(54) PROCESSING ADDITIVES FOR HYDRAULIC CEMENTS

(75) Inventors: Josephine Ho-wah Cheung, Waltham; David Francis Myers, Acton, both of MA (US)

(73) Assignee: W.R. Grace & Co.-Conn., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/524,803

(22) Filed: Sep. 30, 1999

Related U.S. Application Data

(63) Continuation of application No. 09/085,379, filed on May 26, 1998, now Pat. No. 6,048,393.
(60) Provisional application No. 60/060,815, filed on Oct. 1, 1997.

(51) Int. Cl.$^7$ .............................. C04B 24/12; C04B 28/04
(52) U.S. Cl. ..................... 106/727; 106/709; 106/714; 106/715; 106/732; 106/808; 106/823
(58) Field of Search .................................... 106/709, 715, 106/714, 727, 732, 808, 823

(56) References Cited

U.S. PATENT DOCUMENTS

| | | | |
|---|---|---|---|
| 3,329,517 | 7/1967 | Dodson, Jr. et al. | 106/90 |
| 4,943,323 | 7/1990 | Gartner et al. | 106/808 |
| 4,990,190 | 2/1991 | Myers et al. | 106/727 |
| 5,017,234 | 5/1991 | Gartner et al. | 106/781 |
| 5,084,103 | 1/1992 | Myers et al. | 106/727 |
| 6,048,393 | * 4/2000 | Cheung et al. | 106/727 |

* cited by examiner

*Primary Examiner*—Anthony Green
(74) *Attorney, Agent, or Firm*—Craig K. Leon; William L. Baker

(57) ABSTRACT

This invention relates to enhancing the compressive strength of cements after 1, 3, 7 and 28 days following hydration and to improving porosity and finished surfaces of the hardened cements and concretes made therefrom. The improved cements are prepared using certain hydroxylamine additives in amounts of up to 0.1% which preferably are added during grinding of the cement in which case the amines further act as grinding aids.

22 Claims, 1 Drawing Sheet

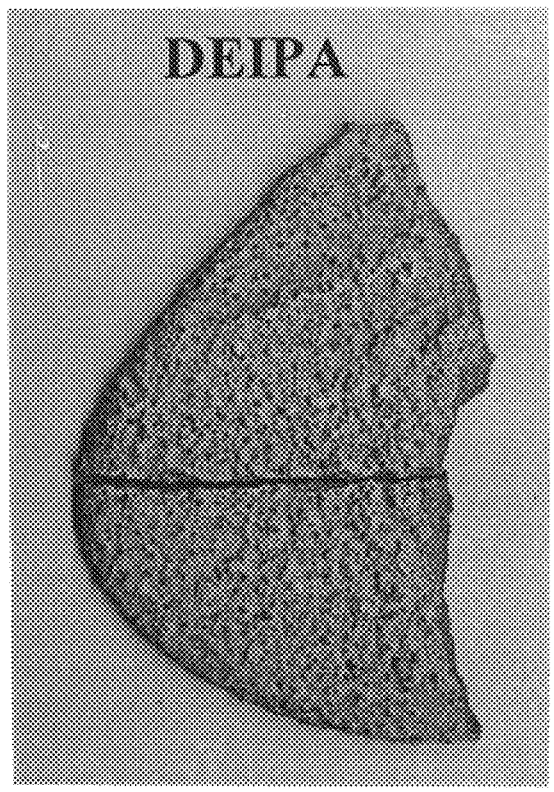 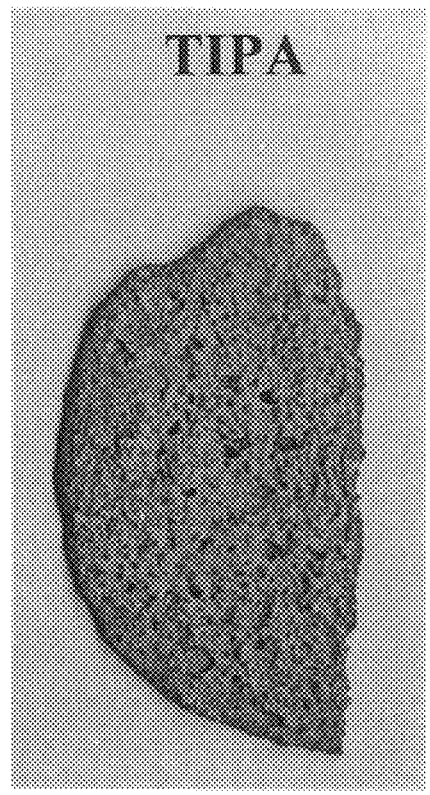
Figure 1
Figure 2
Prior Art

PROCESSING ADDITIVES FOR HYDRAULIC CEMENTS

This is a continuation, of application Ser. No. 09/085,379, filed May 26, 1998, now U.S. Pat. No. 6,048,393, which claims the benefit of U.S. Provisional Application No. 60/060,815, filed Oct. 1, 1997.

FIELD OF THE INVENTION

This invention relates to improving the strength properties, the porosity and the finished surfaces of Portland cement and blended cement compositions. More specifically it relates to a hydraulic cement composition such as Portland cement to which is added an additive which may be interground with the cement clinker to improve grinding efficiency or may be intermixed with the powdered cement prior to or in conjunction with the addition of water and which improves the strength, porosity and finished surfaces of the hydrated cement and compositions made from such cement, such as Portland cement concrete.

BACKGROUND OF THE INVENTION

The term cement is used to designate many different kinds of materials useful as binders or adhesives. Hydraulic cements are powdered materials which, when mixed with water, form a "paste" that hardens slowly. If further mixed with sand it forms a "mortar" and if mixed with sand and coarse aggregate, such as rock, it forms a "concrete" which are rock-hard products. These products are commonly referred to as hydraulic cement mixes. Portland cement is distinguished from other cements by the different components of which it is composed, and the requirement that it meet particular standard specifications established in each country (see *Cement Standards of the World*, Cembureau, Paris, Fr.) For example, in the United States, the American Society for Testing and Materials (ASTM), American Association of State Highway and Transportation Officials, as well as other government agencies, have set certain basic standards for cement which are based on principal chemical composition requirements of the clinker and principal physical property requirements of the final cement mix. For purposes of this invention the term "Portland cement" is intended to include all cementitious compositions which meet the requirements of the ASTM (as designated by ASTM Specification C150), or the established standards of other countries.

Portland cement is prepared by sintering a mixture of components including calcium carbonate (as limestone), aluminum silicate (as clay or shale), silicon dioxide (as sand) and miscellaneous iron oxides. During the sintering process, chemical reactions take place wherein hardened nodules, commonly called clinkers, are formed. Portland cement clinker is formed by the reaction of calcium oxide with acidic components to give primarily tricalcium silicate, dicalcium silicate, tricalcium aluminate, and a ferrite solid solution phase approximating tetracalcium aluminoferrite.

After the clinker has cooled, it is then pulverized together with a small amount of gypsum (calcium sulfate) in a finish grinding mill to provide a fine, homogeneous powdery product known as Portland cement. Due to the extreme hardness of the clinkers, a large amount of energy is required to properly mill them into a suitable powder form. Energy requirements for finish grinding can vary from about 33 to 77 kW h/ton depending upon the nature of the clinker. Several materials such as glycols, alkanolamines, amine acetates, aromatic acetates, etc., have been shown to reduce the amount of energy required and thereby improve the efficiency of the grinding of the hard clinkers. These materials, commonly known as grinding aids, are processing additives which are introduced into the mill in small dosages and interground with the clinker to attain a uniform powdery mixture. In addition to reducing grinding energy, the commonly used processing additives listed above are frequently used to improve the ability of the powder to flow easily and reduce its tendency to form lumps during storage.

Because of the rigid compositional and physical requirements for forming suitable Portland cement clinker, clinker becomes a relatively expensive raw material. For certain applications, it is possible to substitute less expensive fillers such as limestone or clinker substitutes such as granulated blast furnace slags, natural or artificial pozzolan, pulverized fuel ash, and the like, for a portion of the clinker. As used herein, the term filler refers to an inert material that has no later age strength enhancing attributes; the term "clinker substitute" refers to a material that may contribute to long term compressive strength enhancement beyond 28 days. The addition of these fillers or clinker substitutes to form "blended cements" is limited in practice by the fact that such addition usually results in a diminution in the physical strength properties of the resultant cement. For example, when a filler such as limestone is blended in amounts greater than 5%, the resultant cement exhibits a marked reduction in strength, particularly with respect to the strength attained after 28 days of moist curing (28-day strength). As used herein, the term "blended cements" refers to hydraulic cement compositions containing between 2 and 90% more conventionally between 5 and 60%, fillers or clinker substitute materials.

Various other additives may be added to cement to alter the physical properties of the final cement. For example, alkanolamines such as monoethanolamine, diethanolamine, triethanolamine and the like are known to shorten the set time (set accelerators) as well as enhance the one-day compressive strength (early strength) of cements. However, these additives have little beneficial effect on the 28-day set strength of the finished cement and in some cases may actually diminish it. This behavior is described by V. Dodson, in *"Concrete Admixtures"*, Van Reinhold, New York, 1990, who states that calcium chloride, the best known set-time accelerator and early-age strength enhancer reduces compressive strengths at later-ages.

U.S. Pat. Nos. 4,990,190, 5,017,234 and 5,084,103, the disclosures of which are hereby incorporated by reference, describe the finding that certain higher trihydroxyalkylamines such as triisopropanolamine (hereinafter referred to as "TIPA") and N,N-bis(2-hydroxyethyl)-2-hydroxypropylamine (hereinafter referred to as "DEIPA") will improve the late strength (strength after 7 and 28 days of preparation of the wet cement mix) of Portland cement, especially Portland cements containing at least 4 percent $C_4AF$. The strength-enhancing higher trihydroxyalkylamine additives described in these patents are said to be particularly useful in blended cements.

Although TIPA was able to improve the late strength properties of cement compositions, it cannot improve the early strength nor setting properties. More surprising is the observation that it tends to increase the amount of air entrained in the cement. In order to improve the early strength, setting and air entrainment properties of set cement composition containing TIPA, Myers et al taught the incorporation of known early-strength enhancers and setting accelerators, such as TEA or alkali metal salts, and known air detraining agent (ADA), such as those illustrated in U.S. Pat. No. 5,156,679.

Although the incorporation of ADA's in cement compositions containing TIPA were able to decrease the air contents, they were not able to reduce or eliminate the formation and release of bubbles from the cement compositions. This occurrence may lead to set cement compositions with large porosity and poor finished surfaces, if proper placing and finishing practices are not followed.

An additive is highly desirable which can simultaneously improve setting property, and improve strength properties at all ages, without entraining large air voids. This is desirable as it can lead to cement compositions such as Portland cement concrete with lower porosities and better finished surfaces.

SUMMARY OF THE INVENTION

The present invention relates in one aspect to the discovery that N,N-bis-2-hydroxyethyl)-2-propanolamine) ("DEIPA") and N,N-bis-(2-hydroxypropyl)-N-(hydroxyethyl)amine ("EDIPA") surprisingly give significant early strength enhancement (at 1 and 3 days) in addition to late strength enhancement (at 7 and 28 days) in ordinary hydraulic as well as blended hydraulic cements. Also surprising is the finding that DEIPA and EDIPA entrap less air and produce less bubble formation and foaming in cement compositions than those containing TIPA. Further surprising is the finding that these amines produce cements exhibiting reduced and smaller porosities and better finished surfaces than cements containing TIPA. These new additives can be simply added to the cement itself or added during the customary grinding of the cement clinker to improve grinding efficiency and/or the flow of the ground clinker and to reduce the tendency of the cement to form lumps during storage.

In accordance with the present invention, there are provided hydraulic cement compositions comprising a mixture of hydraulic cement and optionally fine and/or coarse aggregate, which when mixed with an additive comprising "DEIPA" or "EDIPA" produces a hydraulic cement composition that exhibits enhanced 1, 3, 7 and 28 day compressive strength properties as well as other physical properties noted above.

Also provided in accordance with this invention is a method of preparing enhanced strength hydraulic cements or blended hydraulic cements possessing additional desired properties comprising intergrinding a mixture of clinker, gypsum and between 2% and 80% by weight filler or clinker substitute, together with an additive that is effective as a grinding aid, improves the ability of the ground cement to flow easily, reduces the tendency of the cement to form lumps during storage, and enhances the 1,3,7 and 28-day strength as well as other desired properties noted above, said additive comprising "DEIPA", "EDIPA" or combinations thereof.

BRIEF DESCRIPTION OF THE DRAWINGS

FIG. 1 is a photomicrograph of an illustrative cement composition having the additive of the invention.

FIG. 2 is a photomicrograph of a prior art cement composition having triisopropanolamine (TIPA) as an additive.

DETAILED DESCRIPTION OF THE INVENTION

The present invention is directed to a hydraulic cement composition exhibiting enhanced early (i.e., 1 and 3 day) and late (i.e., 7 and 28 days) compressive strength properties after mixing with water and allowing the cement composition to set. Other desired properties as discussed above are also improved.

It is a general belief that a chemical can either enhance compressive strength properties at early days or at late days, but not at all ages. For example, Dodson in the above cited "Concrete Admixtures", states that calcium chloride and triethanolamine (TEA) enhance strength properties at early ages but not at late ages. Myers et al employed higher trihydroxyalkylamines, such as TIPA, in U.S. Pat. Nos. 4,990,190, 5,017,234 and 5,084,103. According to the foresaid patents, TIPA and other higher trihydroxyalkylamines, N,N-bis(2-hydroxyethyl)2-propanolamine ("DEIPA") and tris(2hydroxybutyl)amine, were disclosed to improve compressive strength properties at 7 and 28 days but not at early days. This development of improved late-age strength properties and increased air entrapment can both be attributed to the presence of the bulky hydroxypropyl groups which leads to a reduced tendency for adsorption, as illustrated by Gartner et al in "J. Am. Ceram. Soc." 76(6), 1521–30 (1993). The presence of these bulky hydrophobic groups which is necessary for enhancing late-age strength properties also resulted in cement compositions with higher air entrapment. It is well known in the surfactant literature that changes in the surface activity can be altered by the hydrophobic and hydrophilic groups or the hydrophil-lipophil balance (HLB), as stated by Garrett H. E., "Surface Active Chemicals", Pergamon Press (1972). Thus, the development of late strength properties was always thought to be inseparable from the increased tendency in air entrapment. The discovery in this invention of two specific higher trihydroxyalkylamines capable of improving early-day and late-day strength properties, reducing air entrapment and lowering porosity of cement compositions was surprising.

These enhanced early strength hydraulic cement compositions are prepared by incorporating a strength enhancing additive into a suitable hydraulic cement or cement composition. The early strength enhancing additive is N,N-bis(2-hydroxyethyl)2-propanolamine ("DEIPA") or N,N-bis(2-hydroxypropyl)-N-(hydroxyethyl)amine ("EDIPA"). DEIPA was known previously only to improve later strength (strength after 7 days) of hydraulic cements and its effect to improve setting, early day strength, air entrainment, porosity and finished surface properties were surprising. The DEIPA and EDIPA additives of the invention are added to the cement in an amount up to 0.1%, preferably less than 0.05%, and most preferably between 0.001% and 0.03%, based on the weight of the cement. The additive can be in its neat (amine) form or may be in its neutralized form such as an acetate, gluconate, sulfate, nitrate, nitrite, phenolate and the like. Further, the additive may be converted into its ester form (e.g. an ester of an organic acid, preferably a lower acid such as an acetate ester), since, upon addition to the high pH of a hydrating cement, it will undergo hydrolysis and revert back to the alcohol.

A particular advantage of the additive of the invention is that it may be either interground or intermixed with the cement. As used herein, the terms "interground" and "intermixed" refer to the particular stage of the cement processing in which the DEIPA or EDIPA is added. They may be added to the clinker during the finish grinding stage and thus interground to help reduce the energy requirements and provide a uniform free flowing cement powder with reduced tendency to form lumps during storage. It is also possible to add the subject additives as an admixture to powdered cement either prior to, in conjunction with, or after the addition of water when effecting the hydraulic setting of the cement. Further, the additives of this invention may be supplied in a pure concentrated form, or diluted in aqueous or organic solvents, and may also be used in combination with other chemical admixtures, including but not limited to: accelerating admixtures, air entrainers, air detrainers, water-reducing admixtures, retarding admixtures (as defined in ASTM C494) and the like, and mixtures thereof. The additive according to the invention may be used with ordinary cement or with blended cements.

One skilled in the art, using the preceding detailed description, can utilize the present invention to its fullest extent. The following examples are provided to illustrate the invention, but should not be construed as limiting the invention in any way except as indicated in the appended claims. All parts and percentages are by weight unless otherwise indicated and additives are expressed as percent active ingredient as solids based on the weight of dry cement (% s/c). Compressive strengths of the cement samples were determined in accordance with ASTM method C109. The following examples were prepared using commercially available cements and clinkers.

EXAMPLE 1

This example illustrates the improved porosity and finish surface of mortars made with DEIPA. Two mortars were made in accordance to EN 196 standard—one containing DEIPA and the other containing an equivalent amount of TIPA for comparison. After determination of the air content, the mortars were poured and allowed to cure for 1 day without tamping or vibration. Electronic reproductions (see FIG. 2) of the surface of each sample show that mortar made with cement interground with triisopropanolamine (TIPA) created many large surface holes and large pores in the mortar. These large holes and pores were, however, not seen with cement made with DEIPA (see FIG. 1).

EXAMPLE 2

This example illustrates the reduction in air contents from mortars made with industrial cements interground to equal fineness as determined by Blaine specific area (BSA) measurements with DEIPA and TIPA from 2 plants. Standard mortars were produced using the procedure specified in EN 196. The air contents results of mortars made are shown in Table I.

TABLE I

| Plant | Additive | Dosage (%) | BSA ($m^2$/kg) | Air (%) |
|---|---|---|---|---|
| 1 | DEIPA | 0.006 | 418 | 5.1 |
| 1 | TIPA | 0.010 | 418 | 7.2 |
| 2 | DEIPA | 0.010 | 338 | 5.7 |
| 2 | TIPA | 0.010 | 340 | 6.8 |

EXAMPLE 3

This example illustrates the reduced tendency for foaming or bubble generation with DIEPA. Cement pastes were produced from cements interground with DEIPA and TIPA from two plants. The reduced foaming tendency for paste made with typical high range water reducers is also illustrated. The water reducers used were naphthalene sulfonate-based (NSFC) and melamine-based (MSFC) water-reducers. Twenty grams of as weighed into a 50 ml test tube. Twenty grams of water was then added into the test-tube. The cement paste was shaken for 15 seconds. Immediately after shaking, the level at the top height of the bubbles was marked. The foam result is calculated as the volume percent of foam in the total paste solution. Results are shown in Table II.

TABLE II

| Plant | Additive | Dosage (%) | BSA ($m^2$/kg) | Air (%) |
|---|---|---|---|---|
| 1 | DEIPA | 0.006 | 418 | 5.5 |
| 1 | TIPA | 0.010 | 418 | 9.0 |
| 2 | DEIPA | 0.010 | 338 | 5.5 |
| 2 | TIPA | 0.010 | 340 | 11.5 |
| 2 | DEIPA + NSFC | 0.010 | 338 | 7.8 |
| 2 | TIPA + NSCF | 0.010 | 340 | 13.2 |
| 2 | DEIPA + MSFC | 0.010 | 338 | 4.5 |
| 2 | TIPA + MSFC | 0.010 | 340 | 9.3 |

EXAMPLE 4

This example illustrates the reduction in air entrainment and bubble formation of mortar and concrete made with DEIPA as an additive. In this test, 0.15 g of additive was to 550 g of water in a mixing bowl. One thousand grams of cement was subsequently added into the mixing bowl set to mix at low speed. After 30 seconds of mixing, 2600 g of masonry sand was added into the cement paste mixture. The mixing was allowed to mix for a total of 5 minutes. In the case of the TIPA mix, the air content was more than the DEIPA and the triethanolamine (TEA) mixes. We also observed a decrease in bubble formation and an enhancement in workability of mortar surfaces when DEIPA was used. The results are summarized in Table III. A rating of 10 is best and 0 is worst for workability.

TABLE III

| Cement | Additive | Air (%) | Amount of Bubbles | Workability |
|---|---|---|---|---|
| A | TIPA | 4.1 | most | 8 |
| A | TEA | 2.6 | few | 7 |
| A | DEIPA | 3.2 | some | 9 |

EXAMPLE 5

This example illustrates the reduction in air content, bubble formation and improvement of finish surfaces in mortars made with DEIPA and conventional concrete admixtures. The concrete admixtures used were naphthalene sulfonate-based water reducer (NSCF), melamine-based water reducer (MSFC), copolymers of acrylic acid and oxyalkylene water reducer (COMB), tall-oil fatty acid-based air entrainer (TOFA) and gum rosin-based air entrainer. In this test, 2000 g of cement, 4500 g of concrete sand were mixed with enough water to give a flow of 90–100%. Cement additives and concrete admixtures were added with the admixed water. Results are shown in Table IV.

TABLE IV

| Cement | Additive + Admixture | w/c | Slump (cm) | Air (%) | Bubbles | Finish Surface |
|---|---|---|---|---|---|---|
| A | TEA + NSFC | 0.525 | 9.8 | 3.3 | few | excellent |
| A | DEIPA + NSFC | 0.525 | 9.9 | 3.7 | few | good |
| A | TIPA + NSFC | 0.525 | 10.5 | 3.5 | some | poor |
| A | TEA + MSFC | 0.510 | 9.7 | 3.5 | few | fair |
| A | DEIPA + MSFC | 0.510 | 9.8 | 3.9 | some | fair |
| A | TIPA + MSFC | 0.510 | 10.4 | 4.5 | many | fair |
| A | TEA + COMB | 0.500 | 10.0 | 4.5 | few | excellent |
| A | DEIPA + COMB | 0.500 | 10.7 | 4.1 | few | excellent |
| A | TIPA + COMB | 0.500 | 10.5 | 4.3 | many | fair |
| A | TEA + TOFA | 0.550 | 9.6 | 13.4 | some | good |
| A | DEIPA + TOFA | 0.550 | 9.7 | 13.0 | few | excellent |
| A | TIPA + TOFA | 0.550 | 9.7 | 13.4 | many | poor |
| A | TEA + gum rosin | 0.525 | 10.4 | 15.0 | some | fair |
| A | DEIPA + gum rosin | 0.525 | 10.6 | 12.6 | few | good |
| A | TIPA + gum rosin | 0.525 | 10.7 | 12.7 | few | good |

EXAMPLE 6

This example illustrates the enhanced compressive strengths of mortars produced from six different Portland cements with the addition of DEIPA when compared with cements prepared with TIPA and TEA. Two inch mortar cubes were produced from six commercially available cements using the procedure specified in ASTM C109. Additives were added to the mixing water before the addition of the cement, at a dosage of 0.0001 g of additive per gram of cement. Compressive strengths of the resulting cubes were measured at ages of 1, 3, 7 and 28 days. Table V shows the DEIPA is generally superior to TEA and TIPA in its ability to improve early compressive strength (at 1, and 3 day) and also late compressive strength (at 7 and 28 day) properties.

EXAMPLE 7

This example illustrates the unexpected strength enhancements by EDIPA at 2, 7 and 28 days. Standard mortars were produced with two commercial cements using the procedure specified in ASTM C109 and compressive strengths were measured of 2 inch cubes made with the mortars measured at 2, 7 and 28 days.

TABLE V

| Cement | Additive | Dosage (% s/s) | Flow (%) | Air (%) | Comp. Strength (MPa) | | | | Comp. Strength | | | |
|---|---|---|---|---|---|---|---|---|---|---|---|---|
| | | | | | 1 Day | 3 Day | 7 Day | 28 Day | 1 Day | 3 Day | 7 Day | 28 Day |
| A | TEA | 0.010 | 120 | 8.2 | 9.2 | 21.3 | 31.0 | 35.3 | 100 | 100 | 100 | 100 |
| A | DEIPA | 0.010 | 118 | 9.2 | 9.5 | 23.3 | 32.8 | 43.6 | 103 | 109 | 106 | 123 |
| A | TIPA | 0.010 | 118 | 9.4 | 9.1 | 20.9 | 26.0 | 35.3 | 99 | 98 | 84 | 111 |
| B | TEA | 0.010 | 119 | 9.1 | 6.1 | 18.5 | 26.8 | 44.8 | 100 | 100 | 100 | 100 |
| B | DEIPA | 0.010 | 120 | 9.8 | 6.8 | 20.4 | 30.3 | 43 | 111 | 110 | 113 | 96 |
| B | TIPA | 0.010 | 118 | 9.8 | 5.5 | 17.8 | 26.5 | 45 | 90 | 96 | 99 | 100 |
| C | TEA | 0.010 | 112 | 9.1 | 7.9 | 20.3 | 34.2 | 41.4 | 100 | 100 | 100 | 100 |
| C | DEIPA | 0.010 | 118 | 9.5 | 7.6 | 20.7 | 31.3 | 42.4 | 96 | 102 | 92 | 103 |
| C | TIPA | 0.010 | 116 | 10 | 7.2 | 20 | 29.6 | 41.8 | 91 | 99 | 87 | 101 |
| D | TEA | 0.010 | 118 | 9.3 | 11.5 | 23.9 | 30.6 | 39.1 | 100 | 100 | 100 | 100 |
| D | DEIPA | 0.010 | 118 | 11.1 | 11.9 | 23.6 | 30.6 | 42.8 | 103 | 99 | 100 | 109 |
| D | TIPA | 0.010 | 118 | 11.8 | 10.3 | 22.5 | 29.7 | 43.3 | 90 | 94 | 97 | 111 |
| E | TEA | 0.010 | 111 | 9.2 | 10.7 | 21.6 | 28.4 | 41.0 | 100 | 100 | 100 | 100 |
| E | DEIPA | 0.010 | 113 | 9.4 | 12.4 | 23.7 | 32.5 | 49.8 | 116 | 110 | 114 | 121 |
| E | TIPA | 0.010 | 112 | 8.7 | 11.3 | 22.2 | 29.8 | 48.6 | 106 | 103 | 105 | 118 |

TABLE VI

| Cement | Additive | Dosage (% s/s) | Comp. Strength (MPa) | | | Comp. Strength (% over TEA) | | |
|---|---|---|---|---|---|---|---|---|
| | | | 2 Day | 7 Day | 28 Day | 2 Day | 7 Day | 28 Day |
| F | TEA | 0.010 | 21.7 | 28.7 | 37.0 | 100 | 100 | 100 |
| F | EDIPA | 0.010 | 23.1 | 32.9 | 42.5 | 106 | 115 | 115 |
| G | TEA | 0.010 | 21.6 | 30.2 | 37.8 | 100 | 100 | 100 |
| G | EDIPA | 0.010 | 21.6 | 32.5 | 43.0 | 100 | 108 | 114 |

EXAMPLE 8

This example illustrates the enhanced compressive strengths of mortars produced from seven sets of laboratory ground cements. 95 parts of Portland cement (Type I or II) clinker and 5 parts of gypsum were ground in a laboratory mill together with different grinding additives to a Blaine Specific Surface Area of about 360 m$^2$/kg. The TEA, DEIPA and TIPA additives were in the form of acetate salts formed by reacting acetic acid with each of TEA, DEIPA and TIPA, respectively. All grinds were made at ambient temperature using 3325 g of clinker and 175 g of gypsum.

Results on the average grinding efficiency as measured as the average specific surface area produced every 100 rotations of the ball mill showed that TIPA acetate and DEIPA acetate have better grinding efficiencies that TEA.

C-109 mortar strength results showed that DEIPA acetate performs better than TEA acetate and TIPA acetate at all ages. The results of these tests are shown in Table VII.

EXAMPLE 9

This example illustrates the unexpected strength enhancements produced by DEIPA and EDIPA with limestone blended cement. The cements used were made by blending an industrial cement (Cement G) with the Kosmos limestone using a roller mill. The limestone was added at a cement replacement rate of 5% and 10% by weight. The amines were added at an addition rate of 100 ppm. Standard mortars were produced using the procedure specified in ASTM C109 and compressive strengths of 2 inch cubes made with the mortars measured at 2, 7 and 28 days. The blended cements are compared with ordinary non-blended, Portland cements (OPC) in Table VIII.

TABLE VII

| Cement | Additive | BSA (m$^2$/kg) | BSA/ 100 rev | Comp. Strength (MPa) | | | | Comp. Strength (% over HEA-2) | | | |
|---|---|---|---|---|---|---|---|---|---|---|---|
| | | | | 1 Day | 3 Day | 7 Day | 28 Day | 1 Day | 3 Day | 7 Day | 28 Day |
| H | TEA | 359 | 4.95 | 9.5 | 24.8 | 31.0 | 41.0 | 100 | 100 | 100 | 100 |
| H | DEIPA | 364 | 5.71 | 10.7 | 26.9 | 34.3 | 44.8 | 112 | 108 | 111 | 109 |
| H | TIPA | 360 | 5.64 | 9.4 | 26.1 | 34.2 | 44.8 | 99 | 105 | 110 | 109 |
| I | TEA | 357 | 4.24 | 7.7 | 20.3 | 27.0 | 37.0 | 100 | 100 | 100 | 100 |
| I | DEIPA | 360 | 4.60 | 7.8 | 23.8 | 33.2 | 48.5 | 101 | 117 | 123 | 131 |
| I | TIPA | 362 | 4.62 | 7.4 | 23.5 | 32.8 | 47.9 | 96 | 116 | 121 | 129 |
| J | TEA | 361 | 4.02 | 8.6 | 21.7 | 28.3 | 38.2 | 100 | 100 | 100 | 100 |
| J | DEIPA | 358 | 4.57 | 8.1 | 22.1 | 26.9 | 40.6 | 94 | 102 | 95 | 106 |
| J | TIPA | 363 | 4.32 | 7.6 | 22.0 | 26.6 | 41.7 | 88 | 102 | 94 | 109 |
| K | TEA | 358 | 5.37 | 8.1 | 17.5 | 22.6 | 32.8 | 100 | 100 | 100 | 100 |
| K | DEIPA | 357 | 5.60 | 8.8 | 17.6 | 28.0 | 39.7 | 109 | 101 | 124 | 121 |
| K | TIPA | 355 | 5.83 | 8.4 | 17.3 | 27.2 | 39.7 | 104 | 99 | 120 | 121 |
| L | TEA | 410 | 5.44 | 15.9 | 31.4 | 35.1 | 48.2 | 100 | 100 | 100 | 100 |
| L | DEIPA | 407 | 6.10 | 14.9 | 29.0 | 37.0 | 50.9 | 94 | 92 | 105 | 106 |
| L | TIPA | 407 | 6.10 | 12.8 | 26.8 | 34.1 | 47.5 | 81 | 85 | 97 | 99 |
| M | TEA | 358 | 5.14 | 17.7 | 25.0 | 27.2 | 34.9 | 100 | 100 | 100 | 100 |
| M | DEIPA | 359 | 5.63 | 17.2 | 27.9 | 31.6 | 38.6 | 97 | 112 | 116 | 111 |
| M | TIPA | 360 | 5.64 | 18.1 | 26.3 | 31.9 | 36.6 | 102 | 105 | 118 | 105 |
| N | TEA | 359 | 5.16 | 14.1 | 23.2 | 27.2 | 32.5 | 100 | 100 | 100 | 100 |
| N | DEIPA | 360 | 5.40 | 17.5 | 27.8 | 30.6 | 35.1 | 124 | 120 | 112 | 108 |
| N | TIPA | 357 | 5.35 | 17.0 | 27.0 | 32.0 | 39.2 | 120 | 116 | 117 | 121 |

TABLE VIII

| Limestone (%) | Additive | Dosage (%) | Comp. Strength (MPa) 2 days | 7 days | 28 days | Comp. Strength (% over OPC) 2 days | 7 days | 28 days |
|---|---|---|---|---|---|---|---|---|
| 0 | TEA | 0.010 | 21.6 | 30.2 | 37.8 | 100 | 100 | 100 |
| 5 | TEA | 0.010 | 20.7 | 27.2 | 37.9 | 96 | 90 | 100 |
| 5 | DEIPA | 0.010 | 21.4 | 31.2 | 40.3 | 99 | 103 | 107 |
| 5 | EDIPA | 0.010 | 21.7 | 34.0 | 44.4 | 100 | 113 | 117 |
| 5 | TIPA | 0.010 | 20.9 | 32.0 | 42.3 | 97 | 106 | 112 |
| 10 | TEA | 0.010 | 21.1 | 28.9 | 35.3 | 98 | 96 | 93 |
| 10 | DEIPA | 0.010 | 21.7 | 30.5 | 38.8 | 100 | 101 | 103 |
| 10 | EDIPA | 0.010 | 23.0 | 33.2 | 42.5 | 106 | 110 | 112 |
| 10 | TIPA | 0.010 | 20.8 | 31.2 | 40.4 | 96 | 103 | 107 |

EXAMPLE 10

This example illustrates the unexpected early setting from mortars made with industrial cements interground to equal fineness as determined by Blaine specific area (BSA) measurements with DEIPA and TIPA. The Vicat set-time experiment was conducted using the procedure specified in EN 196. The results are shown in Table IX.

TABLE IX

| Plant | Additive | Dosage (%) | BSA ($m^2$/kg) | Water Demand (%) | Initial Set (minutes) | Final Set (minutes) |
|---|---|---|---|---|---|---|
| 1 | DEIPA | 0.006 | 418 | 27.0 | 165 | 210 |
| 1 | TIPA | 0.010 | 418 | 27.0 | 210 | 330 |

EXAMPLE 11

This example and Table 10 demonstrate the combinability of DEIPA and TIPA with each other to obtain enhanced strength enhancement. When further used in combination with known additives such as soluble alkali metal salt set accelerators and set retarders enhancement of cement properties are obtained.

TABLE X

| Cement | Additive | Dosage (% s/s) | Flow (%) | Air (%) | Comp. Strength (MPa) 1 Day | 3 Day | 7 Day | 28 Day | 1 Day |
|---|---|---|---|---|---|---|---|---|---|
| F | TEA | 0.010 | 105 | 8.5 | 10.3 | 22.2 | 29.1 | 38.2 | 100 |
| F | DEIPA/TIPA | 0.005/0.005 | 104 | 8.7 | 10.5 | 23.9 | 30.7 | 41.6 | 102 |

The additives of the invention surprisingly improve the setting time and compressive strength properties of cement-containing compositions at all ages. The low-foaming, low bubble-formation, low porosity and reduced air contents of cement compositions produced by these additives is likewise unexpected.

Unlike cement compositions prepared using prior art and TIPA additives, cement compositions using the additives of the invention do not exhibit undeserved "popping" noises when mixed with water. Finally the unexpected improved finish surface properties of cement compositions prepared from the additives of the invention, allow such compositions to be smoothed more quickly after placement, leading to a savings in labor costs.

What is claimed is:

1. A hydraulic cement composition comprising a mixture of Portland cement and, in an amount of up to 0.1 percent by weight of said cement, an hydroxylamine selected from the group consisting of N,N-bis(2-hydroxyethyl)-2-propanolamine and N,N-bis(2-hydroxypropyl)-N-(hydroxyethyl)amine, said amount being effective to enhance the compressive strength of the cement composition after 1, 3, and 7 days.

2. The cement composition of claim 1 further exhibiting reduced air-entrapment, reduced bubble-formation, improved porosity and enhanced finished surfaces after hydration.

3. The cement composition of claim 1 wherein said hydroxylamine is N,N-bis(2-hydroxyethyl)-2-propanolamine.

4. The cement composition of claim 1 wherein said hydroxylamine is N,N-bis(2-hydroxypropyl)-N-(hydroxyethyl)amine.

5. The cement composition of claim 1 wherein the amount of said hydroxylamine is less than 0.05 percent based on the weight of the cement.

6. The cement composition of claim 1 wherein the amount of said hydroxylamine is between 0.001 and 0.03 percent by weight based on the weight of the cement.

7. The cement composition of claim 1 wherein said cement is a Portland cement containing at least 4 percent tetracalcium aluminoferrite.

8. The cement composition of claim 1 wherein said composition is prepared from a clinker additionally containing a clinker substitute which contributes to compressive strength of said composition beyond 7 days.

9. The cement composition of claim 8 wherein said substitute is limestone.

10. A method of enhancing the 1, 3, and 7 day strength of a cement composition comprising adding to said cement composition up to about 0.2 percent of a hydroxylamine selected from the group consisting of N,N,-bis(2-hydroxyethyl)-2-propanolamine and N,N-bis(2-hydroxypropyl)-N-(hydroxyethyl) amine.

11. The method of claim 10 wherein the cement composition to which said hydroxylamine is added exhibits reduced air entrapment, air bubble formation, foaming and enhanced porosity and finish surfaces when compared to a cement composition to which has been added the same amount of triisopropanolamine.

12. A method of enhancing the compressive strength of a Portland cement composition at 1, 3, and 7 days following hydration of said cement, and reducing air entrapment, bubble-formation in the hydrated cement as well as improving porosity and enhancing its finished surfaces of the hydrated cement, comprising adding an hydroxylamine selected from the group consisting of N,N-bis(2-hydroxyethyl)-2-propanolamine and N,N-bis(2-hydroxypropyl)-N-(hydroxyethyl) amine, in an amount effective to enhance the compressive strength of the cement composition after 1, 3, and 7 days.

13. The method of claim 12 wherein an admixture selected from the group consisting of accelerating admixtures, retarding admixtures, air entrainers, air detrainers, and water reducing admixtures is added in addition to said hydroxylamine.

14. The method of claim 13 wherein said additive comprises a mixture of at least one of said hydroxylamines and a polyoxypropylene-polyoxyethylene block copolymer having a molecular weight of at a least 2500.

15. The method of claim 12 wherein said hydroxylamine comprises a mixture of at least one of said hydroxylamines with triethanolamine, triisopropylamine and mixtures thereof.

16. The method of claim 12 wherein said hydroxylamine comprises a mixture of at least one of said hydroxylamines with a water soluble alkali metal salt.

17. The method of claim 16 wherein the salt comprises a hydroxide, sulfate, chloride, acetate, formate, phenolate, carbonate, silicate, gluconate, or mixture thereof.

18. The method of claim 12 wherein the hydroxylamine is present as a salt of said hydroxlyamine or as an ester of an organic acid.

19. A method of grinding Portland cement clinker comprising intergrinding said clinker with an hydroxylamine in an amount of up to 0.1 percent by weight of clinker, said hydroxylamine being selected from the group consisting of N,N-bis(2-hydroxyethyl)-2-propanolamine and N,N-bis(2-hydroxypropyl)-N-(hydroxyethyl)amine, said hydroxylamine being present in an amount effective to enhance the compressive strength of the cement composition after 1, 3, and 7 days.

20. A strength enhanced blended cement composition comprising a mixture of Portland cement clinker, gypsum, 2% to 80% by weight of clinker substitute, said clinker substitute comprising up to 0.1 percent by weight, based upon said cement, of a hydroxylamine selected from the group consisting of N,N-bis(2-hydroxyethyl)-2-propanolamine and N,N-bis(2-hydroxypropyl)-N-(hydroxyethyl)amine, to increase compressive strength after 1, 3, and 7 days of the cement composition after hydration, the cement composition exhibiting reduced air-entrapment, reduced bubble-formation, improved porosity and enhanced finished surfaces.

21. The composition of claim 20 wherein said clinker substitute is selected from the group consisting of limestone, natural pozzolan, artificial pozzolan, granulated blast furnace slag, and pulverized fuel ash.

22. A concrete composition comprising said hydroxylamine, coarse aggregate, water and the blended cement composition of claim 20.

* * * * *